(12) United States Patent
Venolia et al.

(10) Patent No.: US 8,520,052 B2
(45) Date of Patent: Aug. 27, 2013

(54) FUNCTIONALITY FOR INDICATING DIRECTION OF ATTENTION

(75) Inventors: Gina D. Venolia, Bellevue, WA (US); George G. Robertson, Northeast Harbor, ME (US); John C. Tang, Palo Alto, CA (US); David M. Sirkin, Fisher Island, FL (US); Bongshin Lee, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 231 days.

(21) Appl. No.: 13/019,308

(22) Filed: Feb. 2, 2011

(65) Prior Publication Data
US 2012/0194631 A1 Aug. 2, 2012

(51) Int. Cl.
*H04N 7/15* (2006.01)

(52) U.S. Cl.
CPC ...................................... *H04N 7/15* (2013.01)
USPC ...................... 348/14.1; 348/14.08; 348/14.16

(58) Field of Classification Search
USPC .................. 348/14.01–14.16; 370/260, 261; 709/204–205
See application file for complete search history.

(56) References Cited

U.S. PATENT DOCUMENTS

| | | | |
|---|---|---|---|
| 6,275,258 B1 | 8/2001 | Chim | |
| 6,606,111 B1 * | 8/2003 | Kondo et al. | 348/14.01 |
| 6,889,120 B2 | 5/2005 | Jouppi | |
| 6,914,622 B1 | 7/2005 | Smith et al. | |
| 7,123,285 B2 * | 10/2006 | Smith et al. | 348/14.05 |
| 7,154,526 B2 | 12/2006 | Foote et al. | |
| 7,623,156 B2 | 11/2009 | Nimri et al. | |
| 2007/0263080 A1 | 11/2007 | Harrell et al. | |
| 2008/0034085 A1 | 2/2008 | Chawla et al. | |
| 2009/0147070 A1 * | 6/2009 | Marathe et al. | 348/14.09 |
| 2010/0208078 A1 * | 8/2010 | Tian et al. | 348/169 |
| 2010/0315482 A1 * | 12/2010 | Rosenfeld et al. | 348/14.08 |

OTHER PUBLICATIONS

Williams, et al., "Using Pebbles to Facilitate Remote Communication and Learning," retrieved at <<http://www.ryerson.ca/pebbles/publications/hfespap.pdf>>, 41st Meetings on Human Factors and Ergonomics, 1997, 7 pages.

Breazeal, et al., "Experiments With a Robotic Computer: Body, Affect and Cognition Interactions," retrieved at <<http://robotic.media.mit.edu/pdfs/conferences/breazeal-etal-HRI-07.pdf>>, Proceedings of the ACM/IEEE International conference on Human-Robot interaction, 2007, pp. 153-160.

(Continued)

*Primary Examiner* — Melur Ramakrishnaiah
(74) *Attorney, Agent, or Firm* — Tracy Powell; Powell IP Law, PLLC

(57) ABSTRACT

A communication system is described herein which provides an indicator that helps hub participants of a meeting (or other environmental setting) determine a direction of attention of a satellite participant (who is not physically present at the meeting). The indicator can be implemented as a mechanical pointer, a solid-state display mechanism, a rotating display mechanism, a display mechanism which presents visual information that reflects directionality, and so on. The communication system can assess the directionality of the satellite participant based on any combination of control inputs from explicit input mechanism(s) and/or implicit input mechanism(s). The communication system can also choose between explicit and/or implicit control of the indicator based on at least one selection criterion.

19 Claims, 12 Drawing Sheets

(56) References Cited

OTHER PUBLICATIONS

Curhan, et al., "Thin Slices of Negotiation: Predicting Outcomes From Conversational Dynamics Within the First 5 Minutes," retrieved at <<http://web.media.mit.edu/~sandy/Curhan_Pentland_Thin_Slices_of_Negotiation.pdf>>, Journal of Applied Psychology, vol. 92, No. 3, 2007, pp. 802-811.

Fels, et al., "Toward Determining an Attention Getting Device for Improving Interaction During Video-mediated Communication," retrieved at <<http://www.ryerson.ca/pebbles/publications/attentionfinal.pdf>>, Computers in Human Behaviour, vol. 16, No. 2, 2000, 15 pages.

Goffman, Erving, "Presentation of Self in Everyday Life," retrieved at <<http://clockwatching.net/~jimmy/eng101/articles/goffman_intro.pdf>>, Doubleday Anchor Books, Garden City, NY, 1959, 12 pages.

Hall, Edward T., "A System for the Notation of Proxemic Behavior," retrieved at <<http://www2.uni-erfurt.de/kommunikationswissenschaft/lehrveranstaltungen/Lehrveranstaltungen_WS_2008_09/hall_am_anthropologist.pdf>>, American Anthropologist, vol. 65, No. 5, Oct. 1963, 25 pages.

Hung, et al., "Estimating Cohesion in Small Groups using Audio-Visual Nonverbal Behavior," retrieved at <<http://staff.science.uva.nl/~hhung1/HungGatica-tmm10.pdf>>, IEEE Transactions on Multimedia, vol. 12, No. 6, Oct. 2010, 13 pages.

Lincoln, et al., "Animatronic Shader Lamps Avatars," retrieved at <<http://ieeexplore.ieee.org/stamp/stamp.jsp?tp=&arnumber=5336503>>, Proceedings of the 8th IEEE International Symposium on Mixed and Augmented Reality, Oct. 2009, pp. 27-33.

McGrath, Joseph E., "Groups: Interaction and Performance," retrieved at <<http://users.ece.utexas.edu/~perry/education/382v-s08/papers/mcgrath84.pdf>>, Prentice-Hall, Inc., Englewood Cliffs, NJ, 1984, 31 pages.

Nguyen, David, "MultiView: Spatially Faithful Group Video Conferencing," retrieved at <<http://citeseerx.ist.psu.edu/viewdoc/download?doi=10.1.1.117.6900&rep=rep1&type=pdf>>, May 23, 2005,48 pages.

Olguín, et al., "Sensible Organizations: Technology and Methodology for Automatically Measuring Organizational Behavior," retrieved at <<http://citeseerx.ist.psu.edu/viewdoc/download?doi=10.1.1.148.2236&rep=rep1&type=pdf>>, IEEE Transactions on Systems, Man, and Cybernetics—Part B: Cybernetics, vol. 39, No. 1, Feb. 2009, pp. 43-55.

Paulos, et al., "PRoP: Personal Roving Presence," retrieved at <<http://www.cs.berkeley.edu/~jfc/papers/98/PCchi98.pdf>>, Proceedings of the SIGCHI Conference on Human Factors in Computing systems, Apr. 1998, 8 pages.

Sato, et al., "Attentional Shift by Gaze is Triggered Without Awareness," retrieved at <<http://www.springerlink.com/content/8t07551532428635/fulltext.pdf>>, Experimental Brain Research, 2007, pp. 87-94.

Sellen, Abigail J., "Speech Patterns in Video-Mediated Conversations," retrieved at <<http://research.microsoft.com/en-us/um/people/asellen/publications/speech%20patterns%2092.pdf>>, Proceedings of the SIGCHI Conference on Human Factors in Computing Systems, May 1992, pp. 49-59.

Venolia, et al., "Embodied Social Proxy: Mediating Interpersonal Connection in Hub-and-Satellite Teams," retrieved at http://research.microsoft.com/pubs/118110/ESP_CHI10_Submission.pdf>>, Proceedings of the 28th International Conference on Human factors in Computing Systems, Apr. 2010, 10 pages.

Vertegaal, et al., "Explaining Effects of Eye Gaze on Mediated Group Conversations: Amount or Synchronization?," retrieved at <<http://kryten.cs.queensu.ca/files/p41-vertegaal.pdf>>, Proceedings of the 2002 ACM Conference on Computer Supported Cooperative Work, Nov. 2002, pp. 41-48.

Vertegaal, et al., "GAZE-2: Conveying Eye Contact in Group Video Conferencing using Eye-Controlled Camera Direction," retrieved at <<http://www.hml.queensu.ca/files/gaze2.pdf>>, Proceedings of the SIGCHI Conference on Human Factors in Computing Systems, Apr. 2003, pp. 521-528.

Vishwanath, et al., "Why Pictures Look Right When Viewed from the Wrong Place," retrieved at <<http://www.cnbc.cmu.edu/cns/papers/nn1553.pdf>>, Nature Neuroscience, vol. 08, No. 10, Oct. 2005, pp. 1401-1410.

Yankelovich, et al., "Porta-Person: Telepresence for the Connected Conference Room," retrieved at <<http://labs.oracle.com/projects/mc/CHI2007.pdf>>, CHI Conference on Human Factors in Computing Systems, Apr. 2007, pp. 1-6.

Biocca, et al., "Criteria and Scope Conditions for a Theory and Measure of Social Presence," retrieved at <<http://www.temple.edu/ispr/prev_conferences/proceedings/2001/Biocca1.pdf>>, Media Interface & Network Design Lab, 2001, pp. 1-19.

Riesenbach, et al., "Ontario Telepresence Project—Final Report," retrieved at <<http://www.telepres.com/OTP_Final_Report.pdf>>, Information Technology Research Centre, Telecommunications Research Institute of Ontario, Mar. 1, 1995, 67 pages.

DiMicco, et al., "Using Visualizations to Review a Group's Interaction Dynamics," retrieved at <<http://www.joandimicco.com/pubs/dimicco-wip-chi06.pdf>>, CHI '06 Extended Abstracts on Human Factors in Computing Systems, Apr. 2006, pp. 1-6.

Hauber, et al., "Spatiality in Videoconferencing: Trade-offs between Efficiency and Social Presence," retrieved at <<http://citeseerx.ist.psu.edu/viewdoc/download?doi=10.1.1.116.4961&rep=rep1&type=pdf>>, Proceedings of the 2006 20th Anniversary Conference on Computer Supported Cooperative Work, Nov. 2006, pp. 413-422.

"Telbotics Pebbles," retrieved at <<http://www.telbotics.com/features.htm>>, Telebotics Inc., Toronto, Ontario, retrieved on Oct. 15, 2010, 1 page.

Yankelovich, et al., "Meeting Central: Making Distributed Meetings More Effective," retrieved at <<http://labs.oracle.com/sunlabsday/docs.2004/CSCW2004-OH.pdf>>, Proceedings of the 2004 ACM Conference on Computer Supported Cooperative Work, Nov. 2004, 10 pages.

Yankelovich, et al., "Improving Audio Conferencing: Are Two Ears Better than One?," retrieved at <<http://citeseerx.ist.psu.edu/viewdoc/download?doi=10.1.1.92.1536&rep=rep1&type=pdf>>, Proceedings of the 2006 20th Anniversary Conference on Computer Supported Cooperative Work, Nov. 2006, 10 pages.

Heath, et al., "Disembodied Conduct: Communication through Video in a Multimedia Office Environment," retrieved at <<http://acm.org>>, Proceedings of the SIGCHI Conference on Human Factors in Computing Systems, 1991, pp. 99-103.

Gaver, William, "The Affordances of Media Spaces for Collaboration," retrieved at <<http://acm.org>>, Proceedings of the 1992 ACM Conference on Computer-supported Cooperative Work, 1992, pp. 17-24.

Yamazaki, et al., "Revealing Gauguin: Engaging Visitors in Robot Guide's Explanation in an Art Museum," retrieved at <<http//www.acm.org>>, Proceedings of the 27th International Conference on Human Factors in Computing Systems, 2009, pp. 1437-1446.

Gayer, et al., "A Virtual Window on Media Space," retrieved at <<http://www.sigchi.org/chi95/proceedings/papers/wwg1bdy.htm>>, Proceedings of the SIGCHI Conference on Human Factors in Computing Systems, 1995, pp. 257-264.

Adalgeirsson, et al., "MeBot: A Robotic Platform for Socially Embodied Telepresence," retrieved at <<http://acm.org>>, Proceeding of the 5th ACM/IEEE International Conference on Human-robot Interaction, Mar. 2010, pp. 15-22.

Kuzuoka, et al., "Mediating Dual Ecologies," retrieved at <<http://acm.org>>, Proceedings of the 2004 ACM Conference on Computer Supported Cooperative Work, 2004, pp. 477-486.

Kim, et al., "Meeting Mediator: Enhancing Group Collaboration Using Sociometric Feedback," retrieved at <<http://acm.org>>, CHI '08 Extended Abstracts on Human Factors in Computing Systems, 2008, pp. 457-466.

O'Conaill, et al., "Conversations Over Video Conferences: An Evaluation of the Spoken Aspects of Video-Mediated Communication," retrieved at <<http://acm.org>>, Human Computer Interaction, vol. 8, No. 4, 1993, pp. 389-428.

Inoue, et al., "Integration of Face-to-Face and Video-Mediated Meetings: HERMES," retrieved at <<http://acm.org>>, Proceedings of the International ACM SIGGROUP Conference on Supporting Group Work, 1997, pp. 405-414.

"Zero-Bandwidth Teleconferencing," portal page for video, retrieved at <<http://www.youtube.com/watch?v=bJCUSpilYqM>>, The Architecture Machine, Massachusetts Institute of Technology, 1982, 2 pages.

Argyle, Michael, "Bodily Communication," retrieved on <<http://www.amazon.com>>, Methuen, New York, NY, 1988, Amazon.com product page only, retrieved on Jan. 31, 2011, 4 pages.

"MeBot," retrieved at <<http://robotic.media.mit.edu/projects/robots/mebot/overview/overview.html>>, Overview page, MIT Media Lab, Personal Robots Group, retrieved on Jan. 31, 2011, 2 pages.

"Texai Remote Presence System," retrieved at <<http://www.willowgarage.com/pages/texai/overview>>, Overview pages, Willow Garage, Inc., Menlo Park, CA, 2 pages.

* cited by examiner

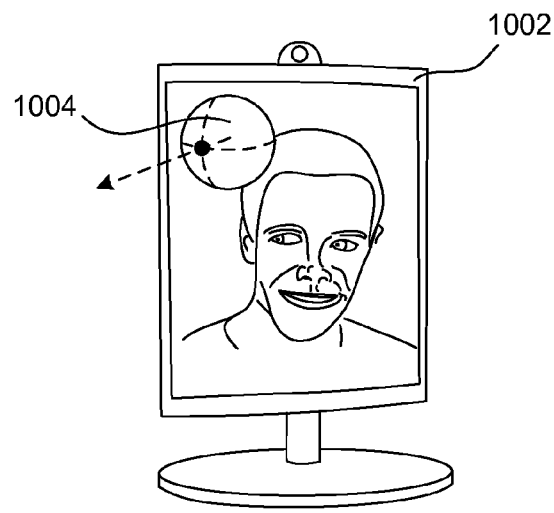
FIG. 10
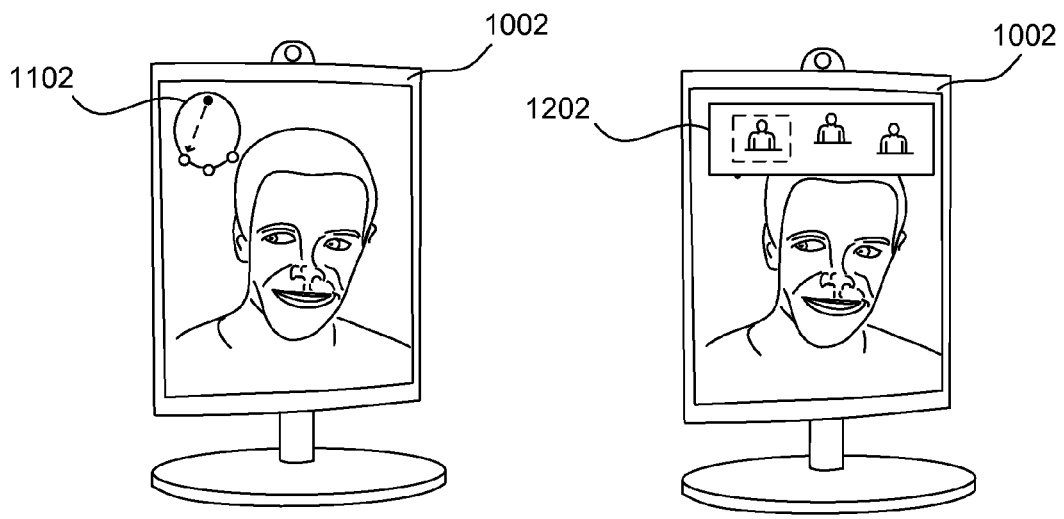
FIG. 11  FIG. 12

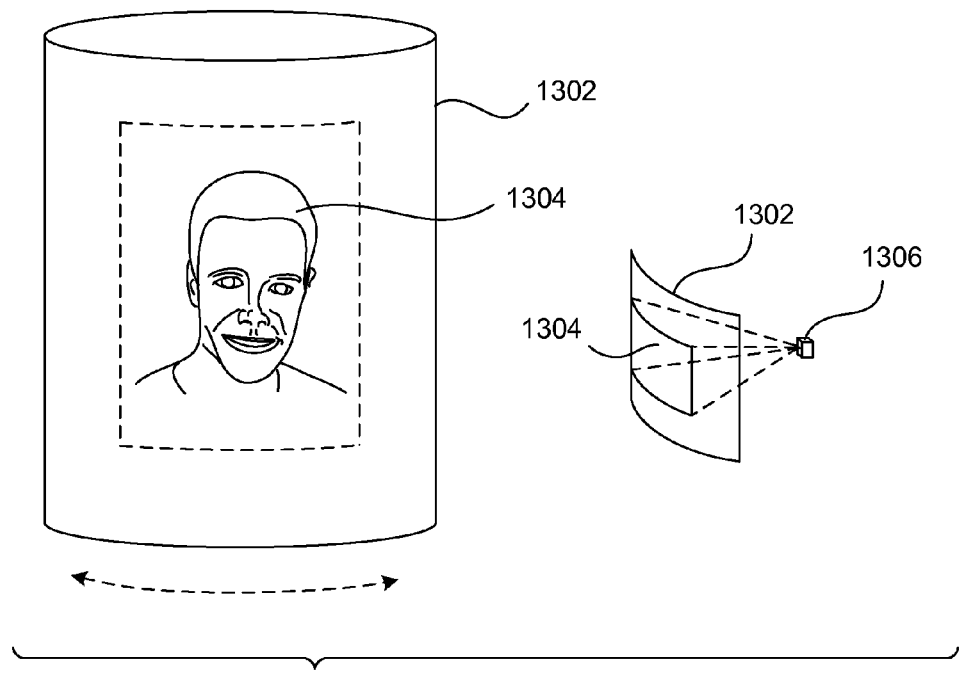
FIG. 13
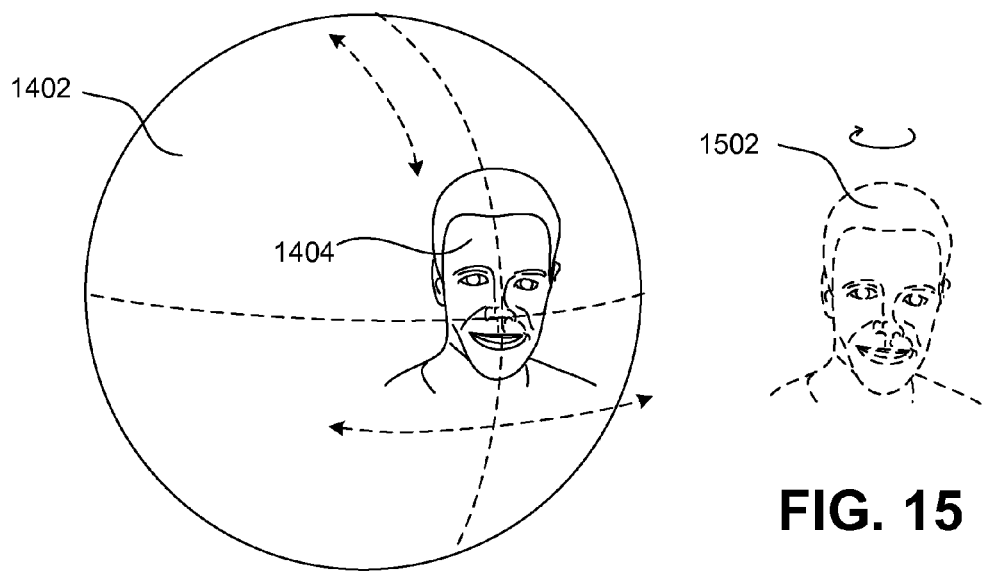
FIG. 14
FIG. 15

FUNCTIONALITY FOR INDICATING DIRECTION OF ATTENTION

BACKGROUND

Videoconferencing technology allows an individual to participate in a meeting or other event from a remote location. In conventional systems, the meeting room may include a display mechanism and one or more speakers which together present an audio-visual representation of the remote participant. The meeting room also includes one or more cameras and one or more microphones which together capture an audio-visual representation of one or more participants who are physically present in the meeting room. The local participants in the meeting room are referred to herein as hub participants because they define the core locus of the meeting. The remote participant is referred to as a satellite participant because he or she represents a person who is attending the meeting from a remote location.

Videoconferencing technology has enjoyed significant commercial success. Yet there are various instances in which this technology does not provide a fully satisfactory user experience. For example, consider the scenario in which the satellite participant directs a question or comment to a specific hub participant. It is often difficult for the hub participants to determine the target of the satellite participant's question or comment. This is because the visual representation of the satellite participant does not preserve some of the subtle communication cues by which people normally determine the directionality of a speaker's message.

For instance, the hub participants may notice changes in the satellite participant's head or eye gaze. But these cues are ambiguous in the visual representation of the satellite participant. When the satellite participant is looking straight ahead, each hub participant may perceive the satellite participant as looking directly at him or her, individually (an effect typically experienced when watching a TV newscaster). And when the satellite participant is looking to one side, each hub participant may perceive the satellite participant as looking to his or her left or right (but not aimed at anyone specifically).

The challenges noted above are presented by way of example, not limitation. Videoconferencing technology may suffer from yet other shortcomings Further, other environments (besides videoconferencing environments) may experience similar difficulties to those set forth above.

SUMMARY

A communication system is described herein for indicating a direction of awareness of a first entity, such as a satellite participant who maintains a virtual presence at a meeting. In one implementation, the communication system operates by receiving an explicit control input from at least one explicit input mechanism, and/or an implicit control input from at least one implicit input mechanism. The explicit control input reflects an express indication of the first entity's direction of awareness (as specified by the first entity), while the implicit control input reflects an inferred indication of the direction of awareness of the first entity. The communication system processes these control inputs to provide an explicit control output and/or an implicit control output, respectively. A mode selection module selects at least one of the explicit control output and the implicit control output based on at least one selection criterion, to generate a selected control output. An output mechanism then adjusts a position of an indicator based on the selected control output. In one environment, the indicator may assist a second entity (such as a hub participant) in determining the direction of awareness of the first entity.

The explicit input mechanisms can include any type of a knob, lever, key input mechanism, mouse device, touch-sensitive input mechanism, etc. The implicit input mechanisms can include any type of head movement detection mechanism, eye gaze detection mechanism, and so on.

In one implementation, the mode selection module is configured to select the implicit control output when explicit control has not been provided for a predetermined amount of time. Alternatively, or in addition, the mode selection module is configured to select the implicit control output when it is determined that the first entity has directed his or her attention at a target object for a predetermined amount of time. Alternatively, or in addition, the mode selection module can receive an express instruction from the satellite participant to use either the explicit control output or the implicit control output, or both. By virtue of the last-mentioned provision, a user can effectively disable either explicit control or implicit control, or both.

The communication system can rely on one or more different types of output mechanisms. In one case, an output mechanism corresponds to a mechanical pointer that is driven by a motor or other movement mechanism. In another case, the output mechanism corresponds to a solid-state display mechanism. In another case, the output mechanism corresponds to rotating display mechanism. In another case, the output mechanism corresponds to a display mechanism for presenting visual information that indicates the direction of awareness of the first entity, and so on. These examples are representative, rather than exhaustive.

By virtue of the communication system, the second entity (e.g., a hub participant) can more readily determine the person to whom the first entity (e.g., a satellite participant) is directing his or her questions, comments, gestures, and/or general attention (e.g., without necessarily asking a question).

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 10-12 show three implementations of the indicator as visual information which is presented on a flat-screen display mechanism.

FIGS. 13 and 14 show two implementations of the indicator as visual information which is presented on a curved display surface.

FIG. 15 shows an implementation of the indicator as holograph, etc.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative communication system for indicating a direction of awareness of a person to another person. Section B describes illustrative methods which explain one manner of operation of the communication system of Section A. Section C describes illustrative processing functionality that can be used to implement any aspect of the features described in Sections A and B.

Figure 21:
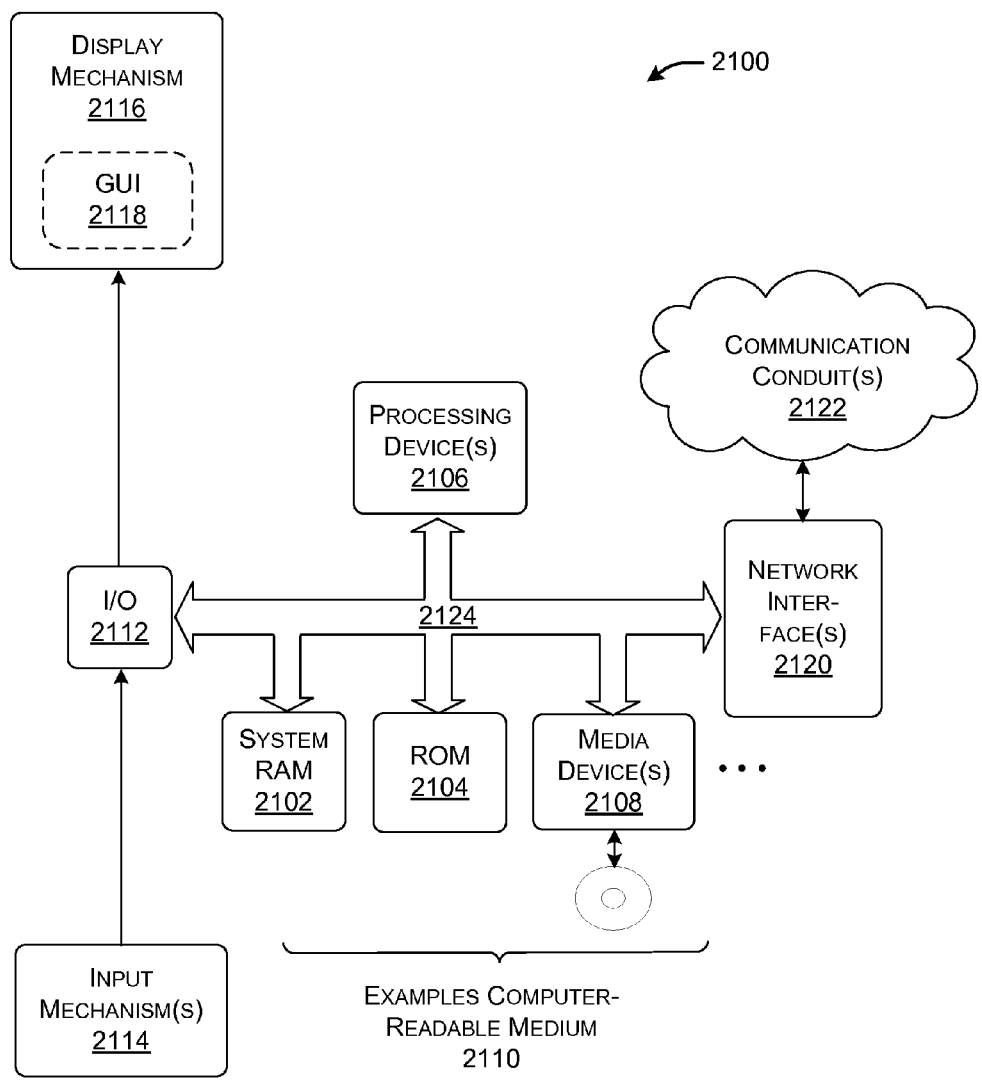
FIG. 21 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms (for instance, by software, hardware, firmware, etc., and/or any combination thereof). In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 21, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms (for instance, by software, hardware, firmware, etc., and/or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" and "illustrative" refer to one implementation among potentially many implementations.

A. Illustrative Communication System

Figure 1:
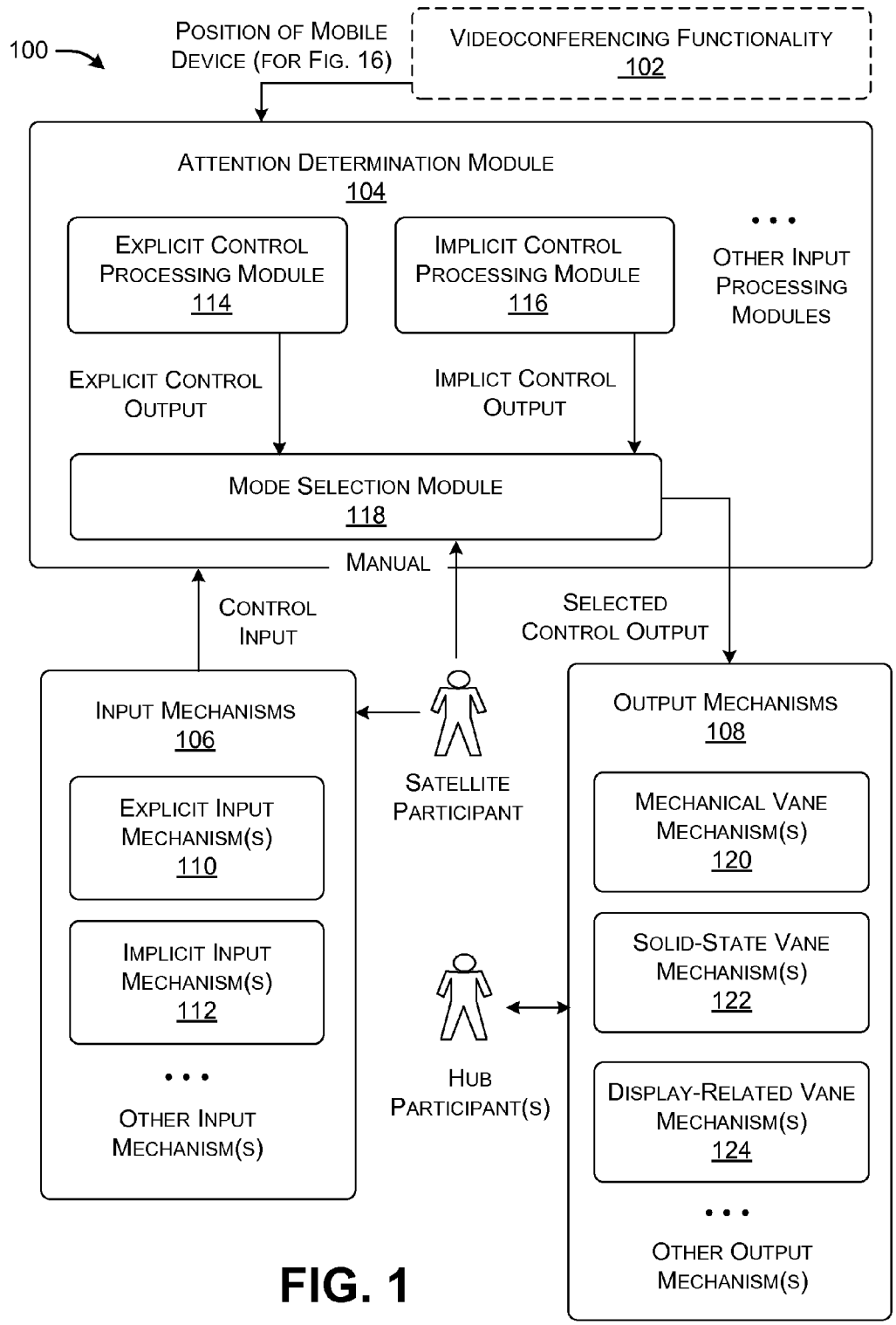
FIG. 1 shows an illustrative communication system which indicates a direction of awareness of a first entity (such as a satellite participant of a meeting) for the benefit of one or more second entities (such as hub participants of the meeting). The communication system conveys the direction of awareness using an indicator, e.g., by changing a position of the indicator to point towards a target object.

FIG. 1 shows an illustrative communication system 100 for determining the direction of awareness of a first entity and conveying that direction of awareness to one or more second entities. In the context most often evoked herein, the communication system 100 can be applied to a hub-and-satellite meeting environment. In this context, the first entity corresponds to a remote participant to a meeting that takes place at a physical location (a "meeting location" herein). This participant is referred to as a satellite participant. The second entity corresponds to one of the participants who is physically present at the meeting location. This participant is referred to as a hub participant. In this situation, the communication system 100 provides cues which help each hub participant determine the person (or object) that the satellite participant is looking at, referred to herein as the target object.

In one environment, the meeting between the hub participants and the satellite participant takes place using videoconferencing functionality 102. The videoconferencing technology 102 includes at least one microphone and at least one video camera for capturing an audio-visual representation of the satellite participant. This equipment is provided at the remote location of the satellite participant. The videoconferencing technology 102 further includes at least one display mechanism and at least one speaker provided at the meeting location for presenting the audio-visual representation of the satellite participant. The videoconferencing technology 102 also includes at least one microphone and at least one video camera for capturing an audio-visual representation of the hub participants. This equipment is provided at the meeting location. The videoconferencing technology 102 further includes at least one display mechanism and at least one speaker provided at the remote location for presenting the audio-visual representation of the hub participants to the satellite participant. By virtue of this equipment, the satellite participant can take part in the meeting in a virtual fashion.

Many examples will be set forth below in which a single satellite participant interacts with two or more hub participants. However, these examples are representative, not exhaustive. In another environment, for instance, two or more satellite participants interact with two or more hub participants. The satellite participants can interact with the communication system 100 from the same remote location or different respective locations. In this context, the communication system 100 can provide an independent indication of the direction of awareness for each satellite participant. Moreover, in this scenario, the communication system 100 can provide an output mechanism at the remote site(s) which determines the direction of awareness of any hub participant. In other words, for example, the communication system 100 can provide a first indicator which indicates the direction of awareness of a satellite participant (for the benefit of the hub participants), and a second indicator which indicates the direction of awareness of a hub participant (for the benefit of the satellite participants).

In another environment, the meeting room can include a single hub participant. This means that the satellite participant cannot possibly be looking at several hub participants; nevertheless, the communication system 100 can help the single hub participant determine what object the satellite participant is looking at. For example, the communication system 100 can indicate whether the satellite participant is looking at the single hub participant, a whiteboard, a collaborative workspace, or some another object.

In another environment, the satellite participant is not physically remote from the hub participants, but may, in fact, be present in the same meeting room as the hub participants. In this situation, the communication system 100 can help disambiguate the direction of awareness of the satellite participant (where, in this case, the term "satellite" no longer connotes remoteness). For example, the satellite participant may wish to provide such a cue because he or she is disabled and cannot readily engage in typical communication cues, although he or she is physically present in the same room with the hub participants.

In another implementation, the communication system 100 can provide an indication of the direction of awareness of the satellite participant in some environment other than a meeting room. For example, the satellite participant may be controlling a robot proxy of any type in any environment, e.g., to perform a task in a dangerous environment (to cite merely one example). The satellite participant can use the communication system 100 to convey his or her direction of awareness to individuals in the vicinity of the robot proxy.

In another implementation, the communication system 100 can provide an indication of the direction of awareness in a context in which one or more hub participants correspond to non-human agents of any type.

Still further applications of the principles described herein are possible. However, as stated above, the following explanation will emphasize the representative scenario in which a single satellite participant interacts with plural hub participants.

The communication system 100 includes an attention determination module 104. The attention determination module 104 receives control input from one or more input mechanisms 106 (referred to in the singular for brevity below). The control input provides information which has a bearing on the direction of awareness of the satellite participant. In other words, the control input provides information which indicates what object(s) the satellite participant is looking at. Based on this information, the attention determination module 104 generates a selected control output, which it sends to one or more output mechanisms 108. The output mechanisms 108 adjust a position of at least one indicator to convey the direction of awareness of the satellite participant. Each of these components of the communication system 100 will be set forth in turn below.

Starting with the input mechanisms 106, the input mechanisms 106 can include one or more explicit input mechanisms 110 and/or one or more implicit input mechanisms 112. The explicit input mechanisms 110 includes mechanisms by which the satellite participant expressly (e.g., manually) indicates his or her direction of awareness. For example, the explicit input mechanisms 110 can include knobs, joy sticks, key input mechanisms, mouse devices, touch-sensitive input mechanisms, and so on. Additional details regarding one manner in which a satellite participant may convey his or her direction of awareness will be set forth in greater detail below. The explicit input mechanisms 110 provide an explicit control input to the attention determination module 104.

The implicit input mechanisms 112 include mechanisms which produce information from which the direction of attention of the satellite participant can be inferred, e.g., without the satellite participant being asked to expressly indicate that information. For example, one type of implicit input mechanism includes a head position determination mechanism. This input mechanism determines the position and orientation of the satellite participant's head and/or other body parts. Another type of implicit input mechanism includes an eye gaze detection mechanism. This input mechanism determines the position of the satellite participant's eyes, e.g., by detecting the reflection of infrared light from the corneas of the eyes. The implicit input mechanisms 112 provide an implicit control input to the attention determination module 104. The attention determination module 104 can use this implicit control input to determine what object(s) lie within the presumed field of view of the satellite participant.

The implicit input mechanisms 112 can also receive other cues which have a bearing on the direction of attention of the satellite participant's awareness. As will be described below, this additional information allows the attention determination module 104 to either bolster or detract from its conclusion as to the direction of the participant's awareness. For example, the implicit input mechanisms 112 can receive information regarding events that take place in the course of the meeting. For example, one such event may indicate that a hub participant has started speaking Another event may indicate that someone has opened up a document on a collaborative workspace or approached a whiteboard, etc.

The attention determination module 104 includes an explicit control processing module 114 for processing the explicit control input from the explicit input mechanisms 110. The explicit control processing module 114 generates a conclusion from the explicit control input regarding the direction of awareness of the satellite participant. This operation may involve determining target object(s) of interest that correspond to a position that is manually specified by the satellite position. The operation then involves determining a position that the indicator (of an output mechanism) can be moved to so as to point to the target object(s). In one implementation, these determinations can be performed based on any type of mapping information which translates the explicit control input to an indicator position. The output of the explicit control processing module 114 is referred to herein as an explicit control output.

In addition, or alternatively, the attention determination module 104 includes an implicit control processing module 116. The implicit control processing module 116 processes the implicit control input from the implicit input mechanisms 112. Like its explicit counterpart, the implicit control processing module 116 generates a conclusion from the implicit control input as to what the satellite participant is looking at, referred to as an implicit control output herein. In one implementation, this operation may involve determining a field of view that is defined by the satellite participant's head position and orientation, and/or the direction of the participant's gaze. The implicit control processing module 116 can then determine the target object(s) within this field of view. The operation then involves determining a position that the indicator (of the output mechanism) can be moved to so as to point to the target object(s).

The implicit control processing module 116 can also take into consideration other events that have a bearing on the satellite participant's head position and/or direction of gaze. The events can be used to help confirm (or detract from) a conclusion as to what object the satellite participant is looking at. For example, the implicit control processing module 116 can draw a tentative conclusion based on a control input from a head detection mechanism that the satellite participant has turned his or her gaze towards a particular hub participant. Further assume the implicit control processing module 116 determines that the hub participant started speaking just before the satellite participant turned his or her head. This confluence of events makes it more likely that the satellite participant did in fact turn his or her head towards the particular hub individual in question.

A mode selection module 118 receives the explicit control output from the explicit control processing module 114 and the implicit control output from the implicit processing module 116. Based on at least one selection criterion, the mode selection module 118 chooses which control output is to govern the output mechanisms 108. In one case, the mode selection module 118 determines that the explicit control output is to govern the output mechanisms 108. In another case, the mode selection module 118 determines that the implicit control output is to govern the output mechanisms 108. In another case, the mode selection module 118 determines that some combination of the explicit control output and the implicit control output is to govern the output mechanisms 108. In another case, the mode selection module 118 determines that neither the explicit control output nor the implicit control output is to govern the output mechanisms 108

For example, in one scenario, the mode selection module 118 is configured to use the explicit control output when the satellite participant is in fact operating the explicit input mechanisms 110 to expressly define his or her direction of awareness. In this case, the mode selection module 118 switches from the explicit control output to the implicit control output a predetermined amount of time after the satellite participant stops interacting with the explicit input mechanisms 110.

In another scenario, the mode selection module 118 is configured to use the implicit control output when that control output indicates that the satellite participant has directed his or gaze towards a particular person or object for more than a predetermined time.

In another scenario, the mode selection module 118 chooses the explicit control output or the implicit control output (or both or neither) depending on an express instruction provided by the satellite participant (or another agent). Through the last-mentioned provision, a user can effectively disable either explicit control or implicit control, or both. Still additional selection criteria can be used to select from among the explicit control output and the implicit control output.

In other implementations, the communication system 100 can be constructed using just the explicit input mechanism(s) 110 (without the implicit input mechanisms(s) 112), or just the implicit input mechanism(s) 112 (without the explicit input mechanism(s) 110). If just the explicit input mechanism(s) 110 are used, the mode selection module 118 can be used to control the activation/deactivation of the explicit input mechanism(s) 110; similarly, if just the implicit input mechanism(s) 112 are used, the mode selection module 118 can be used to control the activation/deactivation of the implicit input mechanism(s) 112. Alternatively, the communication system 100 can entirely eliminate the mode selection module 118.

The mode selection module 118 can provide various damping behavior to exclude transitional and ephemeral targets of awareness. For example, the mode selection module 118 can generate a conclusion that the satellite participant is looking at a particular object only if the satellite participant trains his or her attention on that object in a consistent manner for at least a predetermined amount of time. The output of the mode selection module 118 is referred to herein as a selected control output.

The output mechanisms 108 use one or more techniques to convey the direction of awareness of the satellite participant based on the selected control output. A first category of output mechanisms corresponds to mechanical vane mechanisms 120. Here, the communication system 100 uses the selected control output to adjust the position of a mechanical pointer. A second category of output mechanisms corresponds to solid-state vane mechanisms 122. Here, the communication system 100 uses the selected control output to illuminate selected elements in an array of solid-state indictors (e.g., LEDS or the like). A third category of output mechanisms corresponds to display-related vane mechanisms 124. Here, the communication system 100 uses the selected control output to provide visual information on a display mechanism which conveys the direction of awareness. These categories are representative, rather than exhaustive. FIGS. 3-15 provide additional information regarding particular illustrative types of output mechanisms.

Figure 2:
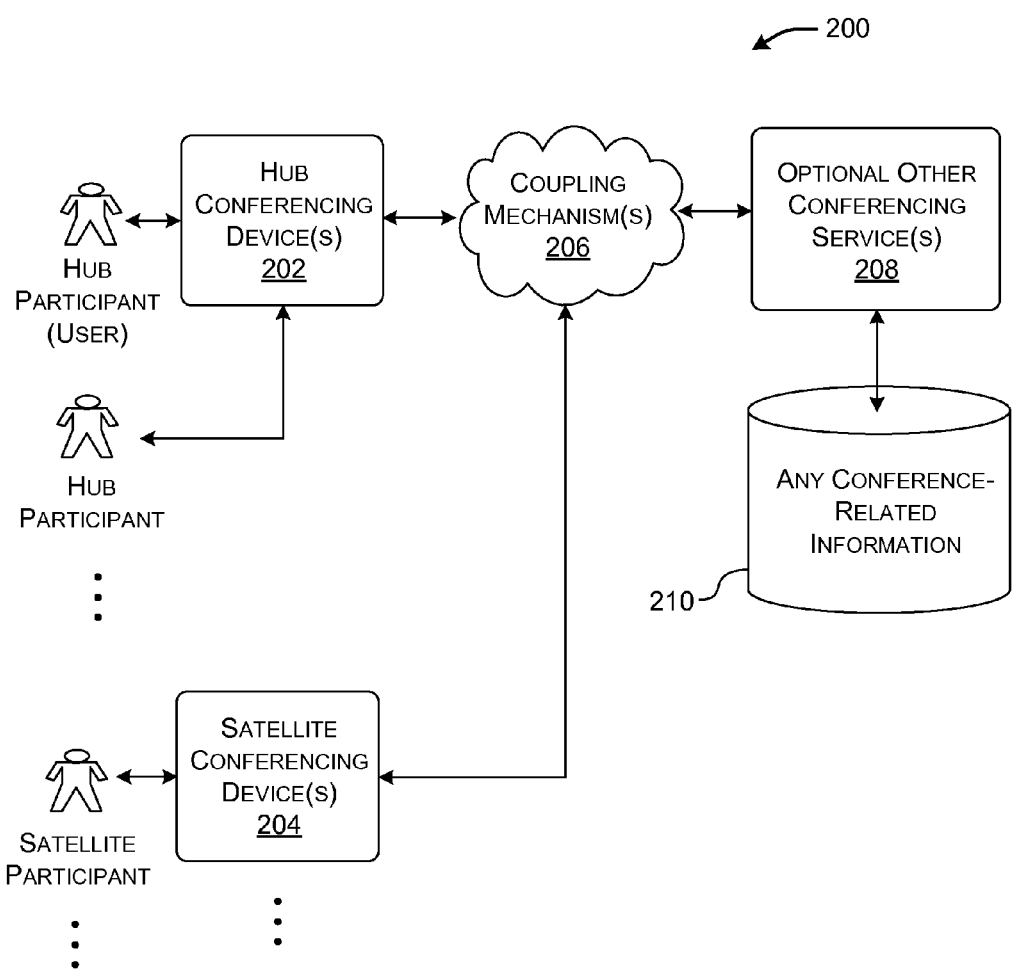
FIG. 2 shows one illustrative implementation of the communication system of FIG. 1.

FIG. 2 shows one implementation 200 of the communication system 100 of FIG. 1. The implementation 200 includes various hub conferencing devices 202 that are provided at the meeting room (or other hub environment), for use by the hub participants. The implementation 200 further includes satellite conferencing devices 204 that are provided at the remote location of the satellite participant, for use by the satellite participant. The hub conferencing devices 202 can include one or more computing devices, such as personal computers, computer workstations, laptop computers, game console devices, set-top boxes, personal digital assistant devices, slate-type computing devices, mobile telephone devices, electronic book-reader devices, and so on, or any combination thereof. The hub conferencing devices 202 can also include one or more display mechanisms, speakers, microphones, video cameras, directional indicators, and so on. The satellite conferencing devices 204 can include the same type of equipment as the hub conferencing devices 202, or some subset thereof.

One or more coupling mechanisms 206 can be used to connect together the hub conferencing devices 202 with the satellite conferencing devices 204. The coupling mechanisms 206 can correspond to any type of local area network (LAN), any type of wide area network (WAN) (e.g., the Internet), any type of point-to-point connections, and so on, or any combination thereof.

FIG. 2 indicates that the implementation 200 can optionally rely on one or more other conferencing services 208 in conjunction with information provided by one or more data stores 210. The conferencing services 208 can be implemented by one or more server computers provided at a central site or distributed over plural sites.

The functions described in connection with FIG. 1 can be mapped to the devices shown in FIG. 2 in many different ways. To cite one example, in one scenario, the attention determination module 104 can be implemented by a computer provided at the same remote site as the satellite participant. But in another example, the attention determination module 104 can be implemented at least in part by a computer provided at the physical meeting location (e.g., the location of the hub participants).

Figure 3:
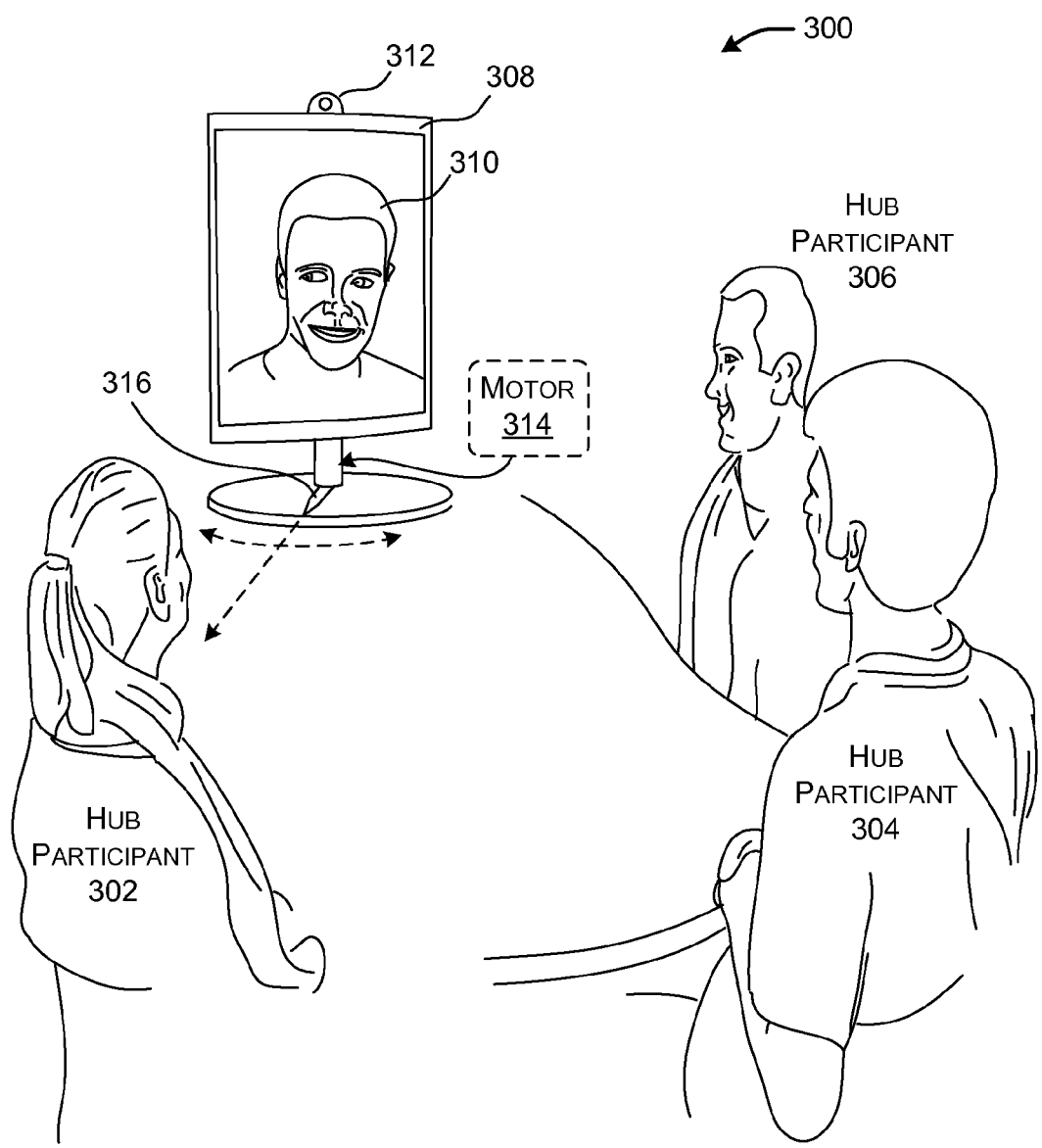
FIGS. 3 and 4 show an implementation of the indicator (used by the communication system of FIG. 1) as a mechanical pointer.

Now advancing to FIG. 3, this figure provides a depiction of three hub participants (302, 304, 306). The hub participants (302, 304, 306) are physically present in a meeting room 300 or other hub environment. FIG. 3 also shows a display mechanism 308 having a display screen which presents a visual representation 310 of a satellite participant who is physically present at a remote site, not at the meeting room 300. Although not shown, the meeting room 300 may include one or more speakers for providing audio information that originates from the satellite participant.

The meeting room 300 also includes a video camera 312 for capturing a video representation of the three hub participants (302, 304, 306). Although not shown, the meeting room 300 can also include one or more microphones which capture audio information which originates from the hub participants (302, 304, 306). Although not shown, the satellite participant has a counterpart display mechanism and speaker(s) for together presenting an audio-visual presentation of the meeting room 300, including the three hub participants. (FIG. 17, to be described in turn, shows one environment in which the satellite participant may operate.)

Finally, the meeting room 300 may also include an output mechanism that includes a motor 314 (such as a servo motor or other movement mechanism) and a mechanical pointer 316. The motor 314 drives the mechanical pointer 316 based on the selected control output provided by the attention determination module 104. In operation, the attention determination module 104 drives the mechanical pointer 316 to a position so that it points at a particular hub participant 302. This is based on the conclusion, made by the attention determination module 104, that the satellite participant is looking at this particular hub participant 302. Again, that determination can be made based on any combination of explicit control input and implicit control input.

The mechanical pointer 316 in this case is a brightly-colored elongate member, about five inches long, that rotates around a base stem of the display mechanism 308 (in as quiet a manner as possible). This is one of many examples. The mechanical pointer 316 can have any shape, size, color, and functionality. Further, the mechanical pointer 316 can be provided at any location within the meeting room 300. Or the indicator can include multiple mechanical pointers (not shown). Further, the mechanical pointer 316 can have any relationship with respect to other equipment provided in the meeting room 300. For instance, in one example, the base member of the display mechanism 308 can house the motor 314 which drives the mechanical pointer 316, but this is merely one option among many.

Figure 4:
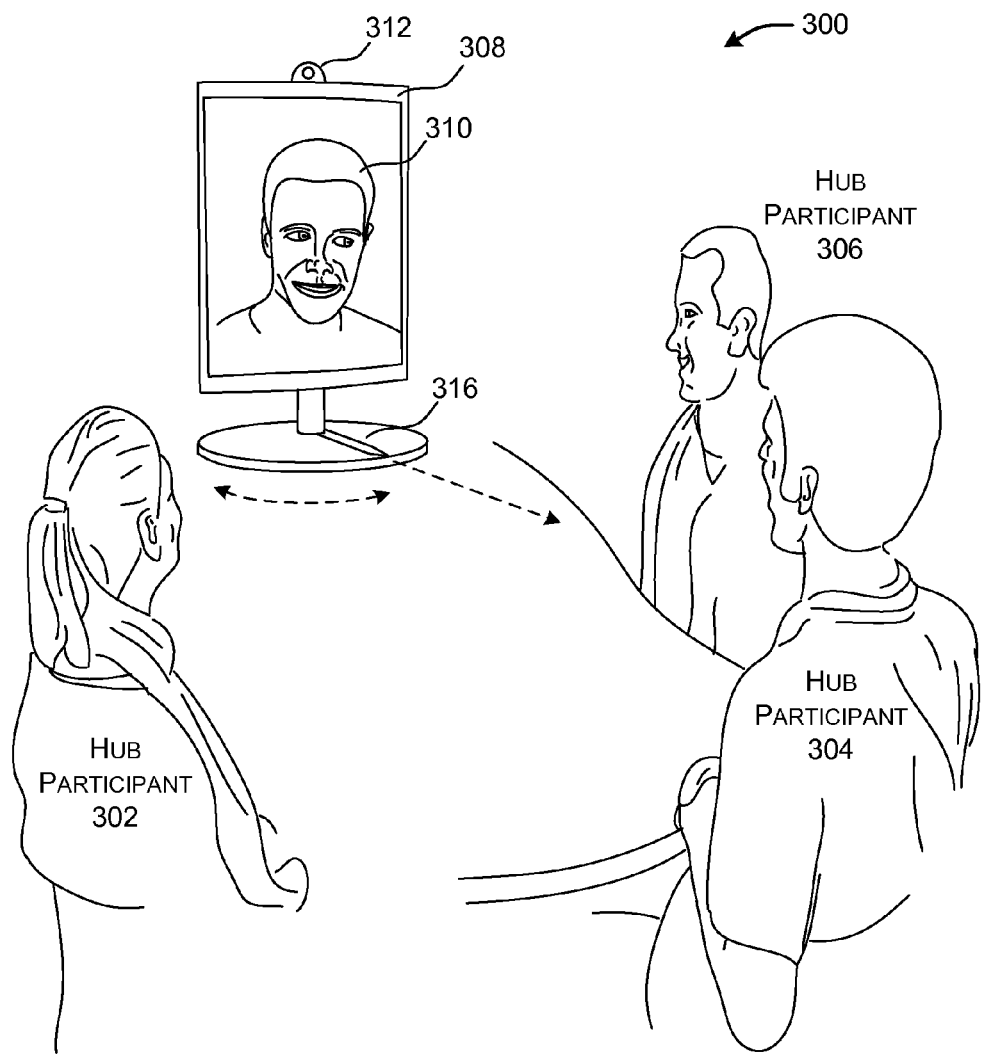

FIG. 4 shows the same meeting room 300 that was introduced in FIG. 3. The only difference is that the satellite participant has now presumably shifted his attention from hub participant 302 to hub participant 306. Accordingly, the attention determination module 104 drives the mechanical pointer 316 to a new location, at which it points at the hub participant 306.

In the examples set forth above, the hub participants (302, 304, 306) can make note of the position of the mechanical pointer 316 as they converse with the satellite participant. Using this approach, the hub participants (302, 304, 306) can be better informed as to the person(s) to whom the satellite participant is directing questions, comments, and/or gestures. Or, in some instances, the satellite participant may be just directing his or her attention towards a particular person without otherwise communicating with that person. For reasons set forth above, this awareness information cannot be readily determined solely based on the visual representation 310 of the satellite participant.

Furthermore, in the case in which explicit control input is provided, the satellite participant is now free to look straight ahead into the video camera, rather shifting his head to telegraph his direction of awareness. In some circumstances, this may provide better user experience for both the satellite participant and the hub participants. Namely, because the satellite participant is looking straight ahead into the video camera, the hub participant to which the indicator is pointed may perceive the satellite participant as looking directly at him or her.

Although not shown in FIGS. 3 and 4, the meeting room 300 can include directional speaker(s) which direct audio information in a particular direction, e.g., by physically adjusting the direction in which one or more speakers are pointed and/or controlling the audio signals delivered to one or more speakers. This effect supplements the hub participants' perception of the direction of awareness of the satellite participant. For example, in FIG. 4, the directional speaker(s) can direct the voice of the satellite participant towards the hub participant 306, based on a determination that the satellite participant is directing his awareness towards this individual.

Figure 5:
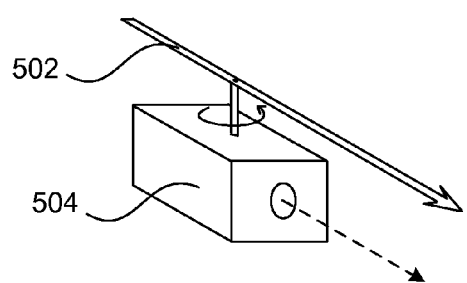
FIGS. 5-7 show different types of mechanical pointers used to indicate direction of awareness.
Figure 6:
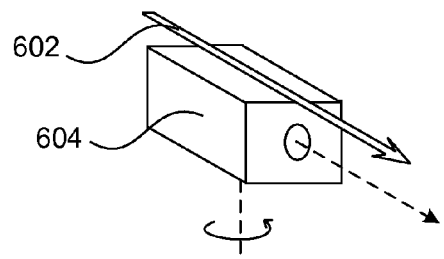
Figure 7:
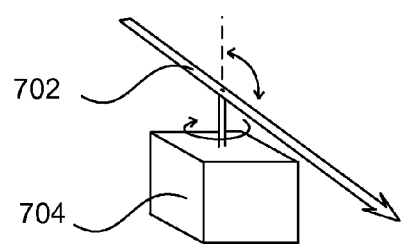

FIGS. 5-7 show three other ways of implementing a mechanical pointer. In FIG. 5, a mechanical pointer 502 is movably attached to (or in proximity to) a video camera 504 provided in the meeting room. In this example, the mechanical pointer 502 can be moved independently of the video camera 504. In FIG. 6, a mechanical pointer 602 is nonmovably attached to a video camera 604. In this example, the mechanical pointer 602 cannot be moved independently of the video camera 604. In other words, the mechanical pointer 602 moves together with the video camera 604. In the examples of FIGS. 3-6, a motor (such as a servo motor) can move the mechanical pointers through some range of angles within a plane.

FIG. 7 shows an example in which a mechanical pointer 702 is movably attached to any type of base member 704. The base member 704 may be integrated with or separate from the display mechanism(s) and/or the video camera(s) provided in the meeting room. The base member 704 may house a motor (such as a servo motor) for moving the mechanical pointer 702 to any orientation within a three dimensional space, rather than a single plane. In this case, the mechanical pointer 702 can indicate whether the satellite participant is looking up or down, as well as left or right.

Figure 8:
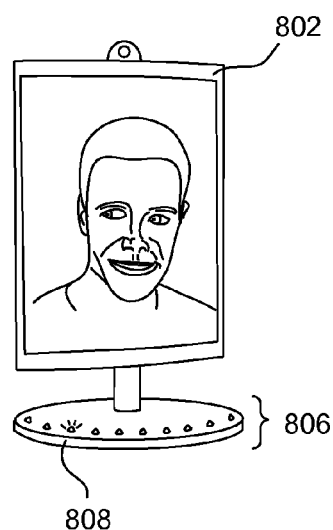
FIG. 8 shows an implementation of the indicator as a solid-state display mechanism.

FIG. 8 shows an example of a solid-state output mechanism. Here, a base member 802 of a display mechanism 804 includes an array 806 of solid-state display elements, such as LEDs or the like. The attention determination module 104 can provide a control output which illuminates one or more of these solid-state display elements 808, to thereby convey the direction of the satellite participant's attention. For example, if a left-most element is illuminated, this means that the satellite participant is looking to the far left; if a right-most element is illuminated, this means that the satellite participant is looking to the far right. In another implementation, the output mechanism can provide a distributed collection of solid-state elements placed in proximity to respective hub participants. The communication system 100 can illuminate a solid-state element in proximity to a particular hub participant to indicate that the satellite participant's attention is being directed to that person.

Figure 9:
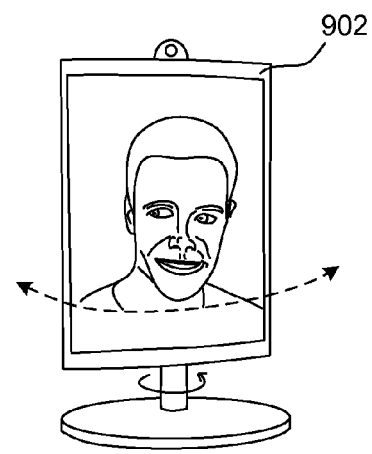
FIG. 9 shows an implementation of the indicator as a rotating display mechanism.

FIG. 9 shows an example of an output mechanism that involves the rotation of a display mechanism 902. That is, the display mechanism 902 incorporates or is coupled to a motor (not shown). The motor moves the display mechanism 902 to a position based on the control output of the attention determination module 104. In other words, the attention determination module 104 drives the entire display mechanism 902 to a position which reflects the direction of attention of the satellite participant.

FIGS. 10-12 show an example in which the output mechanism is a display mechanism 1002 which represents visual information, such as graphical information and/or image information and/or video information, etc. The visual information, in turn, conveys the direction of awareness of the satellite participant. In FIG. 10, for instance, the visual information 1004 depicts a globe having a spot. The spot reflects the direction at which the satellite participant is presumed to be looking at the moment. In FIG. 11, the visual information 1102 depicts an overhead graphical representation of the meeting room or other hub environment. An arrow and/or spot in that depiction can indicate the direction of awareness of the satellite participant. In FIG. 12, the visual information 1202 corresponds to a panoramic representation of the meeting room as seen by the satellite participant. Any type of highlighting (or mark) applied to the panoramic representation can indicate the direction of awareness of the satellite participant. These examples are representative, not exhaustive. In another example (not shown), the visual information can comprise a list of names of individuals in the meeting room. The name of the person that the satellite participant is looking at can be highlighted in any fashion, and so on. This assumes that the respective names and positions of the hub participants have been registered in advance.

FIGS. 13 and 14 show two examples in which the output mechanism is a display mechanism which projects a visual representation of the satellite participant on a curved surface, that surface forming a display screen. For example, in FIG. 13, a cylindrical curved surface 1302 presents a visual representation 1304 of the satellite participant. In FIG. 14, a spherical curved surface 1402 presents a visual representation 1404 of the satellite participant. In operation, the attention determination module 104 adjusts the position of the visual representations (1304, 1404) on the curved surfaces (1302, 1402) based on the presumed direction of awareness of the satellite participant, e.g., such that a normal that projects out from the representation of the satellite participant on the curved surfaces (1302, 1402) generally points in the direction of the target of awareness.

With reference to FIG. 13, one way to accomplish the above-stated functions is by providing a projection mechanism 1306 on a rotatable base at the center of the cylindrical surface (or spherical surface). The cylindrical surface can be implemented by translucent plastic or other material. The attention determination module 104 can then rotate the projection mechanism 1306 to a position that matches the direction of awareness of the satellite participant. At that location, the projection mechanism 1306 can project the visual representation 1304 of the satellite participant onto the curved surface 1302, where it is visible to the hub participants.

FIG. 15 shows a case in which the output mechanism is a hologram representation 1502 of the satellite participant. The attention determination module 104 can rotate the hologram representation 1502 to a position which matches the direction of awareness of the satellite participant. Although not shown, other output mechanisms can achieve the same effect by rotating a physical model of the satellite participant's head (where this would constitute another variation of the mechanical pointer according to the terminology used herein). Although not shown, other output mechanisms can rotate an avatar representation of the satellite participant, and so on.

Figure 16:
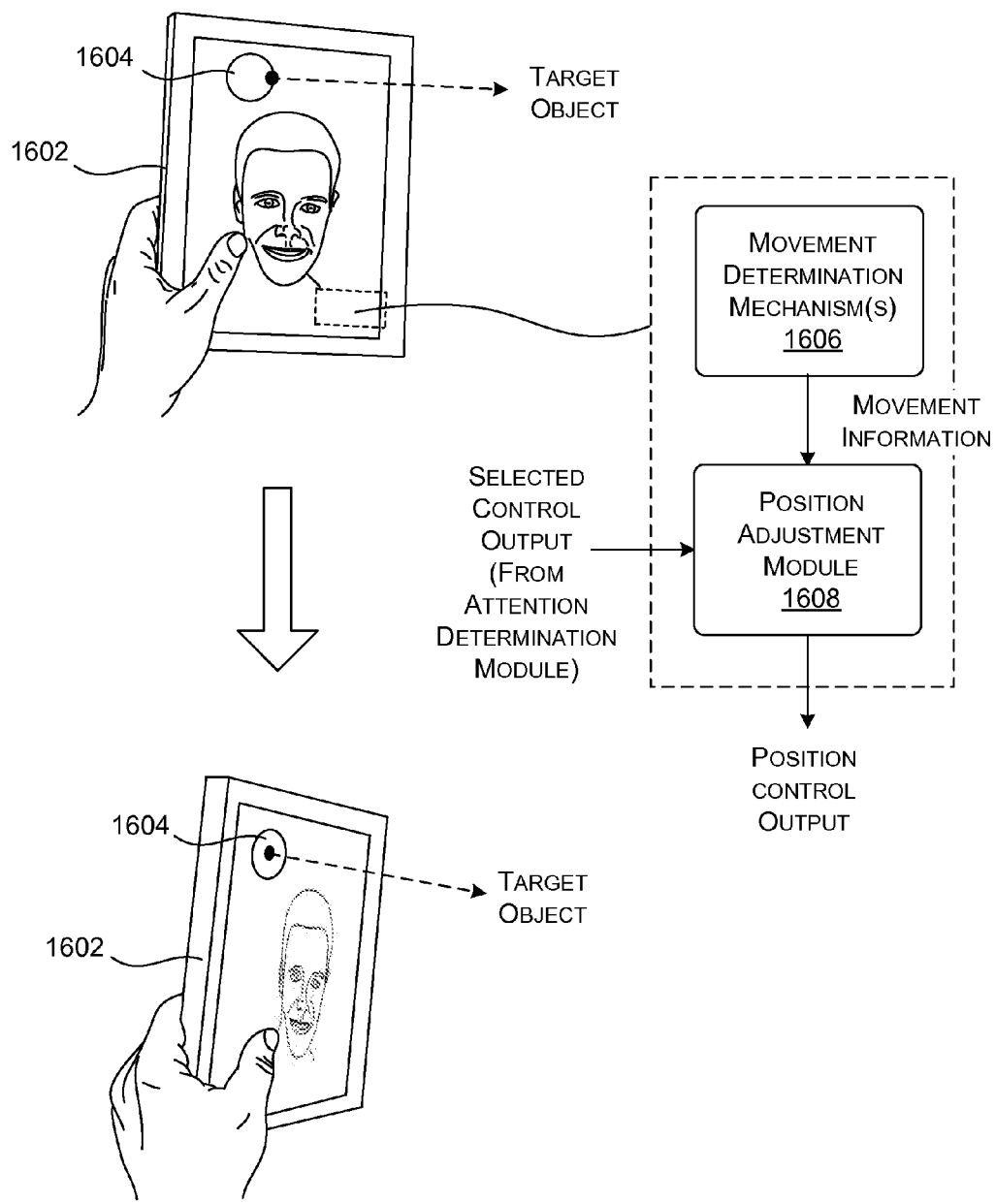
FIG. 16 shows an implementation of an indicator that is associated with a movable computing device. The computing device is configured to maintain the indicator pointed at a target object, regardless of a position and/or an orientation of the computing device.

FIG. 16 shows a case in which the output mechanism corresponds to a display mechanism that is capable of being moved to different positions and/or orientations in the meeting room. For example, in the particular example shown in FIG. 16, the display mechanism is provided by a handheld computing device 1602, such as a slate-type computing device, a personal digital assistant device, a mobile telephone device, an electronic book-reader device, and so on. In other cases, the movable computing device 1602 can correspond to a computing device (such as a laptop computer device) that is generally maintained in a fixed position during use, but can nevertheless be readily moved for any reason.

In one manner of use, assume that the communication system 100 can present an audio-visual representation of the satellite participant on the computing device 1602. Further assume that one of the hub participants is holding the computing device 1602. Other hub participants may be positioned in the meeting room so that they can view and listen to the same audio-visual representation presented by the computing device 1602. But in another implementation, each participant may interact with his or her own computing device (not shown) which presents an audio-visual representation of the satellite participant.

The computing device 1602 can use any type of indicator described above to indicate the direction of awareness of the satellite participant to one or more hub participants. In the example shown in FIG. 16, the computing device 1602 presents an indicator 1604 that comprises visual information that is displayed on the display mechanism of the computing device 1602. More specifically, the visual information comprises an indicator circle having a movable dot; the position of the dot conveys the direction of awareness of the satellite participant. In the top part of FIG. 16, the dot indicates that the satellite participant's direction of awareness is directed at some person or object to the immediate right of the computing device 1602, e.g., because the dot appears at the right side of the indicator circle.

Further assume that the computing device 1602 includes one or more movement determination mechanisms 1606 (e.g., within its housing), such as an accelerometer, an n-axis gyroscopic device (e.g., a three-axis gyroscopic device), and so on. The movement determination mechanism(s) 1606 determine changes in the position and/or orientation of the computing device 1602 to provide movement information. A position adjustment module 1608 receives the movement information from the movement determination mechanism(s) 1606 and the selected control output from the attention determination module 104. Based thereon, the position adjustment module 1608 produces a position control output. The position control output adjusts the position of the indicator 1604 so that it remains pointed at the target object, even though the position and/or orientation of the computing device 1602 may change.

For example, assume that, as shown in the bottom part of FIG. 16, the person holding the computing device 1602 rotates it so that its display surface more directly faces the target object. In response, the position adjustment module 1608 produces a position control output which results in the dot moving from the far right of the indicator circle (as shown in the top part of FIG. 16) to the middle of the indicator circle (as shown in the bottom part of FIG. 16). Once again, the computing device 1602 can include, or can otherwise be associated with, any type of indicator, such as a mechanical indicator, a solid state display mechanism indicator, and so on, or any combination thereof.

In the case in which plural hub participants operate plural respective computing devices, each computing device can include an indicator which points at the common target object, and which furthermore maintains a directional lock on the common target object during movement of the computing device.

Although not shown, any implementation of the output mechanisms 108 can combine two or more of the types of output mechanisms described above. For instance, one implementation can use both a mechanical pointer and on-screen visual information to convey the direction of awareness of the satellite participant.

Figure 17:
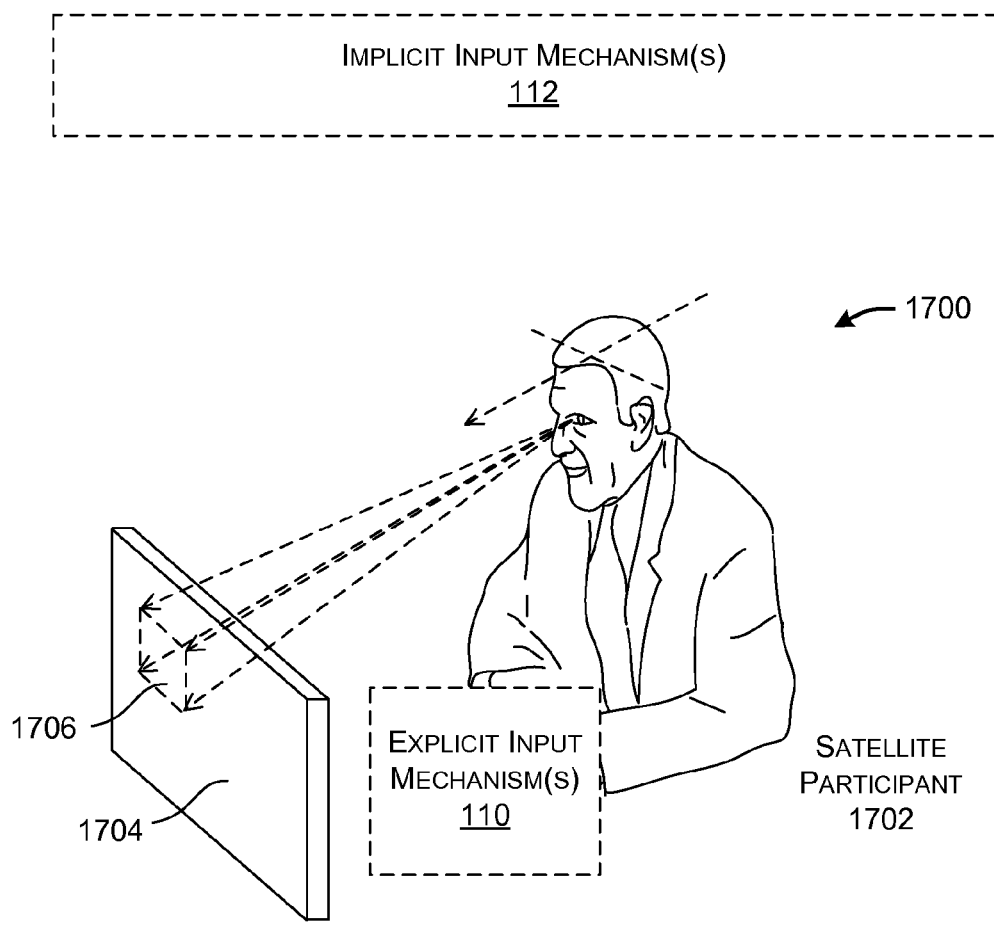
FIG. 17 is a depiction of an environment in which a satellite participant operates, indicating the use of explicit control mechanism(s) and/or implicit control mechanism(s) to define the direction of awareness of the satellite participant.

FIG. 17 now shows an environment 1700 in which a satellite participant 1702 works. As described above, the satellite participant 1702 can view a visual representation of the meeting room via a display mechanism 1704. Although not shown, the environment 1700 can also include one or more speakers for presenting audio information which originates from the meeting room. Although not shown, the environment 1700 can also include one or more video cameras and one or more microphones for together capturing an audio-visual representation of the satellite participant 1702 for presentation to the hub participants.

Further, as described above, the environment 1700 can include one or more explicit input mechanisms 110 by which the satellite participant 1702 can expressly designate his or her direction of awareness. The satellite participant 1702 can perform this function by expressly designating a portion 1706 of a visual representation of the meeting room provided on the display mechanism 1704. The environment 1700 can also include one or more implicit input mechanisms 112 which can infer the direction of awareness of the satellite participant 1702. For instance, the implicit input mechanisms 112 may include a head tracking mechanism which determines a position and orientation of the satellite participant's head, e.g., based on an image representation of the satellite participant's head captured by one or more cameras of any type(s), etc. The implicit input mechanisms 112 may also include an eye gaze determination mechanism which determines a direction of gaze of the satellite participant 1702, e.g., based on an image representation of the satellite participant's eyes captured by one or more cameras of any type(s), etc. The implicit control processing module 116 can use this implicitly-determined position information to cast a frustum out from the head of the satellite participant 1702. That frustum will intersect a plane defined by the screen of the display mechanism 1704, thus defining a particular portion 1706 of the visual representation of the meeting room which corresponds to the satellite participant's presumed focus of interest.

Figure 18:
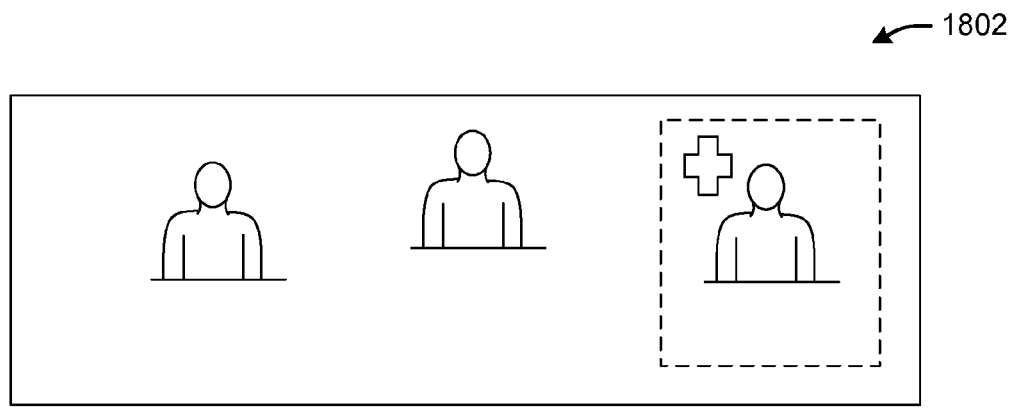
FIGS. 18 and 19 show two visual presentations by which the satellite presentation of FIG. 17 can manually indicate his direction of awareness.
Figure 19:
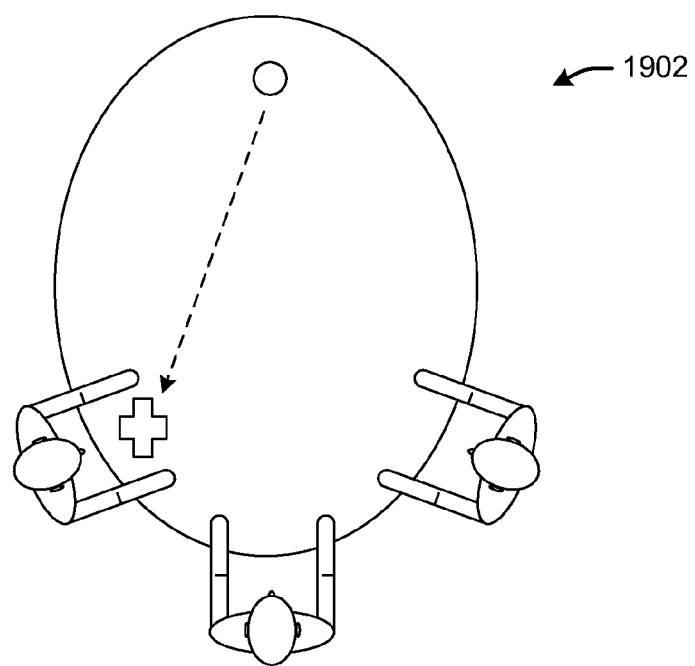

FIGS. 18 and 19 show two different visual representations that may be presented to the satellite participant 1702 (of FIG. 17) via the display mechanism 1704. In FIG. 18, a visual representation 1802 represents a graphical or video panoramic representation of the meeting room, e.g., as captured by the video camera at the meeting room. In FIG. 19, a visual representation 1902 represents an overhead graphical or video representation of the meeting room. In both cases, the visual representation (1802, 1902) depicts the hub participants in the meeting room. The satellite participant 1702 can use any input mechanism to expressly designate a part of the visual representations (1802, 1902), e.g., by using a mouse device to add a mark which indicates his direction of awareness in the meeting room.

The attention determination module 104 can use various techniques to translate an indication of direction of awareness to an indicator position. In a first approach, the video representation of the meeting room encompasses the indicator, enabling the satellite participant to see the indicator on his or her display mechanism 1704. The satellite participant can then use the visual feedback provided by the display mechanism 1704 to manually move the indicator to a desired position, e.g., so that it points to a target of interest. The satellite participant can perform this task using any of the explicit input mechanism(s) 110.

In a second implementation, the attention determination module 104 may predefine a set of possible positions in the meeting room where the hub participants may generally sit, e.g., corresponding to positions around a table or the like. Upon the start of a meeting, each hub participant can then manually indicate where he or she is located within the meeting room. The attention determination module 104 can include mapping information which maps an explicit or implicit designation of a target object with an indication of a position within the meeting room, and which also maps an indication of the position within the meeting room with a pointer position. Hence, when the satellite participant identifies a particular hub participant, the control modules (114, 116) are able to generate a control output which moves the indicator to the appropriate position.

In a third implementation, the communication system 100 can automatically detect the position of the hub participants in the room, e.g., based on image information and/or audio information. For example, at the start of a meeting, the communication system 100 can determine the locations of the hub participants in an image of the meeting room, where that image may contain reference points which establish a frame of reference. Alternatively, or in addition, the communication system 100 can detect the locations of the hub participants in the meeting room based on the directionality of voices which originate from the hub participants. The control modules (114, 116) can leverage this information in the manner stated above for the second implementation, e.g., using mapping information to translate an explicit and/or implicit designation of a target object to a pointer position.

The above three implementations are representative, not exhaustive.

In the particular case of the moveable computing device 1602 of FIG. 16, the control output can contain pointer information which is expressed with reference to any frame of reference, e.g., based on the assumption that the computing device 1602 has a default orientation and position. The position adjustment module 1608 can further modify this control output based on the actual current orientation and/or position of the computing device 1602 within the meeting room. This is one implementation of this operation among many. For example, in another case, the computing device 1602 can forward movement information to the attention determination module 104, and the attention determination module 104 can provide a control output which already takes into account the current position and orientation of the computing device 1602.

B. Illustrative Processes

Figure 20:
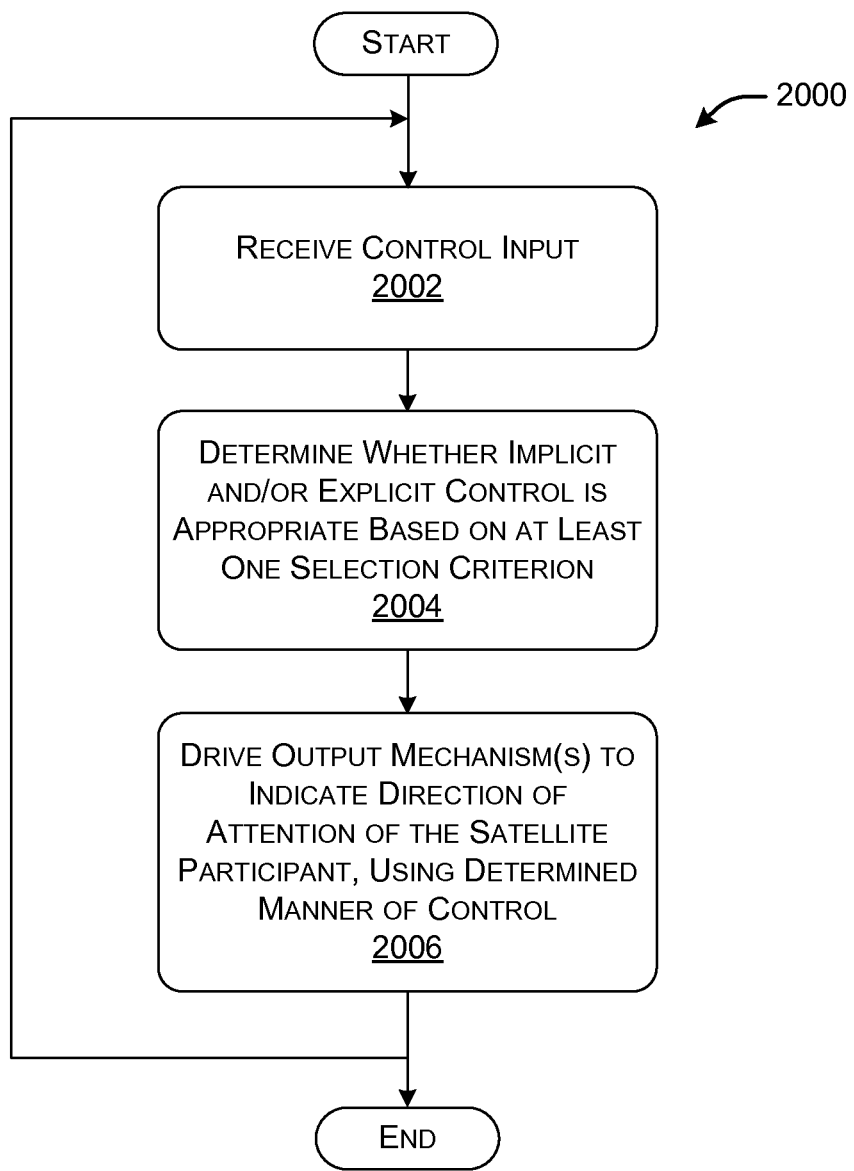
FIG. 20 is a flowchart that shows an overview of one manner of operation of the communication system of FIG. 1.

FIG. 20 shows a procedure 2000 which represents one manner of operation of the communication system 100 shown in FIG. 1. Since the principles underlying the operation of the communication system 100 have already been described in Section A, certain operations will be addressed in summary fashion in this section.

In block 2002, the communication system 100 receives control input from one or more explicit input mechanisms 110 and/or one or more implicit input mechanisms 112.

In block 2004, the mode selection module 118 of the communication system 100 determines whether explicit and/or implicit control (or neither) is appropriate in view of at least one selection criterion. For example, the mode selection module 118 can select implicit control when there is an absence of explicit control for more than a predetermined time. Alternatively, or in addition, the mode selection module 118 can select implicit control when it is appears that the satellite participant is training his or her attention on a target object in the meeting room for more than a predetermined amount of time, and so on. Alternatively, or in addition, the mode selection module 118 can select explicit control and/or implicit control (or neither) based on an express instruction by the satellite participant (and/or any other agent).

In block 2006, the communication system 100 can use the selected control output (determined in block 2004) to drive an indicator provided by an output mechanism. The indicator can be implemented as any of a mechanical pointer, a solid-state display mechanism, a rotating display mechanism, visual information presented on a display mechanism, and so on, or any combination thereof.

C. Representative Processing Functionality

FIG. 21 sets forth illustrative electrical data processing functionality 2100 (also referred to herein a computing functionality) that can be used to implement any aspect of the functions described above. For example, the processing functionality 2100 can be used to implement any aspect of the communication system 100 of FIG. 1, e.g., as implemented in the embodiment of FIG. 2, or in some other embodiment. In one case, the processing functionality 2100 may correspond to any type of computing device that includes one or more processing devices. In all cases, the electrical data processing functionality 2100 represents one or more physical and tangible processing mechanisms.

The processing functionality 2100 can include volatile and non-volatile memory, such as RAM 2102 and ROM 2104, as well as one or more processing devices 2106 (e.g., one or more CPUs, and/or one or more GPUs, etc.). The processing functionality 2100 also optionally includes various media devices 2108, such as a hard disk module, an optical disk module, and so forth. The processing functionality 2100 can perform various operations identified above when the processing device(s) 2106 executes instructions that are maintained by memory (e.g., RAM 2102, ROM 2104, or elsewhere).

More generally, instructions and other information can be stored on any computer readable medium 2110, including, but not limited to, static memory storage devices, magnetic storage devices, optical storage devices, and so on. The term computer readable medium also encompasses plural storage devices. In all cases, the computer readable medium 2110 represents some form of physical and tangible entity.

The processing functionality 2100 also includes an input/output module 2112 for receiving various inputs (via input modules 2114), and for providing various outputs (via output modules). One particular output mechanism may include a presentation module 2116 and an associated graphical user interface (GUI) 2118. The processing functionality 2100 can also include one or more network interfaces 2120 for exchanging data with other devices via one or more communication conduits 2122. One or more communication buses 2124 communicatively couple the above-described components together.

The communication conduit(s) 2122 can be implemented in any manner, e.g., by a local area network, a wide area network (e.g., the Internet), etc., or any combination thereof. The communication conduit(s) 2122 can include any combination of hardwired links, wireless links, routers, gateway functionality, name servers, etc., governed by any protocol or combination of protocols.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A communication system, implemented by physical and tangible functionality, for indicating a direction of awareness of a first entity, comprising:
   an explicit control processing module configured to receive an explicit control input from at least one explicit input mechanism, and in response, provide an explicit control output, the explicit control input reflecting an express indication of the direction of awareness of the first entity;
   an implicit control processing module configured to receive an implicit control input from at least one implicit input mechanism, and in response, provide an implicit control output, the implicit control input reflecting an inferred indication of the direction of awareness of the first entity;
   a mode selection module configured to select from the explicit control output and the implicit control output, to provide a selected control output; and
   an output mechanism configured to adjust a position of an indicator based on the selected control output, the indicator assisting at least one second entity in determining the direction of awareness of the first entity.

2. The communication system of claim 1, wherein the first entity is a satellite participant of a meeting at a meeting location, and wherein said at least one second entity includes a hub participant who is physically present at the meeting location, and wherein video conferencing technology presents an audio-visual representation of the first entity to said at least one second entity.

3. The communication system of claim 1, wherein said at least one explicit input mechanism includes at least one of:
   a knob;
   a lever;
   a key input mechanism;
   a mouse device; and
   a touch-sensitive input mechanism.

4. The communication system of claim 1, wherein said at least one explicit input mechanism is configured to receive a manual selection, by the first entity, of a position within a visual representation of an environment that includes said at least one second entity.

5. The communication system of claim 1, wherein said at least one implicit input mechanism includes one or more of:
   a head movement detection mechanism; and
   an eye gaze detection mechanism.

6. The communication system of claim 1, wherein the mode selection module is configured to select the implicit control output when explicit control has not been received for a predetermined amount of time.

7. The communication system of claim 1, wherein the mode selection module is configured to select the implicit control output when it is determined that the first entity has directed his or her attention at a target object for a predetermined amount of time.

8. The communication system of claim 1, wherein the mode selection module is configured to select the explicit control output, or the implicit control output, or both the explicit control output and the implicit control output, or neither the explicit control output nor the implicit control output, based on an express instruction from the first entity.

9. The communication system of claim 1, wherein the output mechanism comprises one or more of:
   (a) an indicator motor which receives the selected control output, and a mechanical pointer, coupled to the indicator motor, wherein the communication system is configured to use the selected control output to drive the mechanical pointer to a position corresponding to the direction of awareness of the first entity;
   (b) a solid-state display mechanism, wherein the communication system is configured to use the selected control output to drive the solid-sate display mechanism in a manner that indicates the direction of awareness of the first entity;
   (c) a display motor which receives the selected control output, and a movable display mechanism, coupled to the display motor, which provides a visual representation of the first entity for said at least one second entity, wherein the communication system is configured to use the selected control output to drive the movable display mechanism to a position corresponding to the direction of awareness of the first entity; and
   (d) a display mechanism having a display screen, wherein the communication system is configured to use the selected control output to present visual information on the display screen that indicates the direction of awareness of the first entity.

10. A communication system, implemented by physical and tangible functionality, for indicating a direction of awareness, comprising:
   a display mechanism having a display screen, provided at an environment location, for presenting a visual representation of a satellite participant to a hub participant, the hub participant being physically present at the environment location;
   a video camera for capturing a visual representation of the hub participant;
   an attention determination module configured to receive control input from at least one input mechanism, the control input reflecting a direction of awareness of the satellite participant, the attention determination module providing a control output; and
   an output mechanism which is configured to adjust a position of an indicator based on the control output, the indicator assisting the hub participant in determining the direction of awareness of the satellite participant, wherein the output mechanism comprises:
      a motor which receives the control output; and
      a mechanical pointer, coupled to the motor, wherein the communication system is configured to use the control output to drive the mechanical pointer to a position corresponding to the direction of awareness of the satellite participant;
   the communication system being configured to control the position of the indicator in a manner that is independent of movement of the display mechanism having the display screen, and independent of the video camera.

11. The communication system of claim 10, wherein the motor is configured to move the mechanical pointer in a three-dimensional space.

12. The communication system of claim 10, wherein the mechanical pointer is placed in physical proximity to the display mechanism having the display screen.

13. The communication system of claim 10, wherein the output mechanism is a solid-state display mechanism, and wherein the communication system is configured to use the control output to drive the solid-sate display mechanism in a manner that indicates the direction of awareness of the satellite participant.

14. The communication system of claim 10, wherein the output mechanism comprises the display mechanism having the display screen, and wherein the communication system is configured to use the control output to present visual information on the display screen that indicates the direction of awareness of the satellite participant.

15. The communication system of claim 14, wherein the display screen has a curved display surface, and wherein the output mechanism has a projector mechanism for displaying the visual information on the curved display surface.

16. The communication system of claim 10, wherein the output mechanism is associated with the display mechanism having the display screen, and wherein the display mechanism is configured to be moved, and wherein the output mechanism is configured to adjust the position of the indicator to maintain the direction of awareness pointed at a target object.

17. A method, implemented by physical and tangible functionality, for indicating a direction of awareness, comprising:
   receiving an implicit control input from at least one implicit input mechanism, and, in response, providing an implicit control output, the implicit control input reflecting an inferred indication of the direction of awareness of a first entity;
   receiving an explicit control input from at least one explicit input mechanism, and, in response, providing an explicit control output, the explicit control input reflecting an express indication of a direction of awareness of the first entity;
   selecting from the explicit control output and implicit control output to provide a selected control output for use in driving an output mechanism;
   adjusting a position of an indicator, provided by the output mechanism, based on the selected control output, the indicator assisting at least one second entity in determining the direction of awareness of the first entity,
   the output mechanism comprising at least one of:
      a motor in conjunction with a mechanical pointer;
      a solid-state display mechanism; and
      a display mechanism having a display screen for presenting visual information that indicates the direction of awareness of the first entity.

18. The method of claim 17,
   wherein selecting from the explicit control output and implicit control output, to provide a selected control output comprises at least one of:

selecting the implicit control output when explicit control has not been received for a predetermined amount of time;

selecting the implicit control output when it is determined that the first entity has directed his or her attention at a target object for a predetermined amount of time; and selecting the explicit control output, or the implicit control output, or both the explicit control output and the implicit control output, or neither the explicit control output nor the implicit control output, based on an express instruction from the first entity.

19. The method of claim 17, wherein said at least one implicit input mechanism includes one or more of:

a head movement detection mechanism; and an eye gaze detection mechanism.

\* \* \* \* \*